No. 735,460. PATENTED AUG. 4, 1903.
W. L. BURNAM.
REFRACTOMETER.
APPLICATION FILED SEPT. 27, 1902.
NO MODEL. 3 SHEETS—SHEET 3.

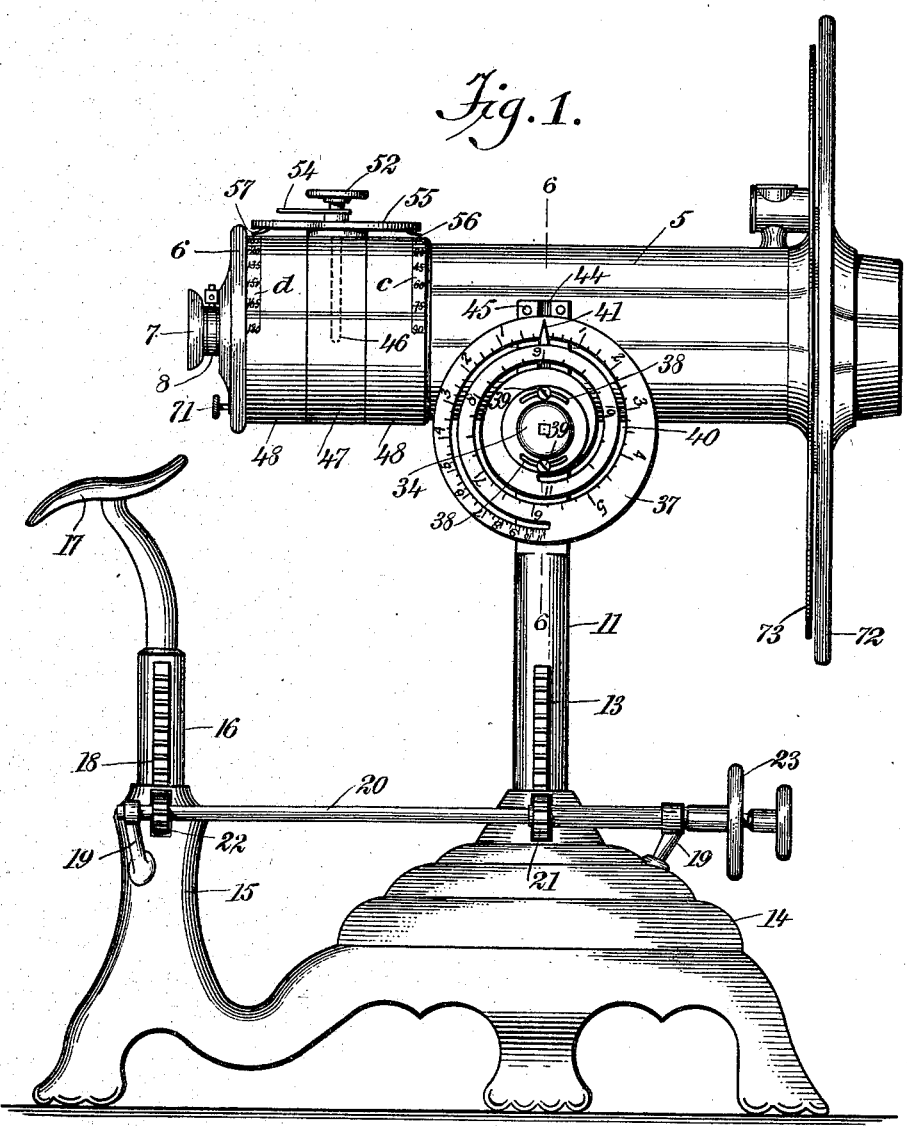

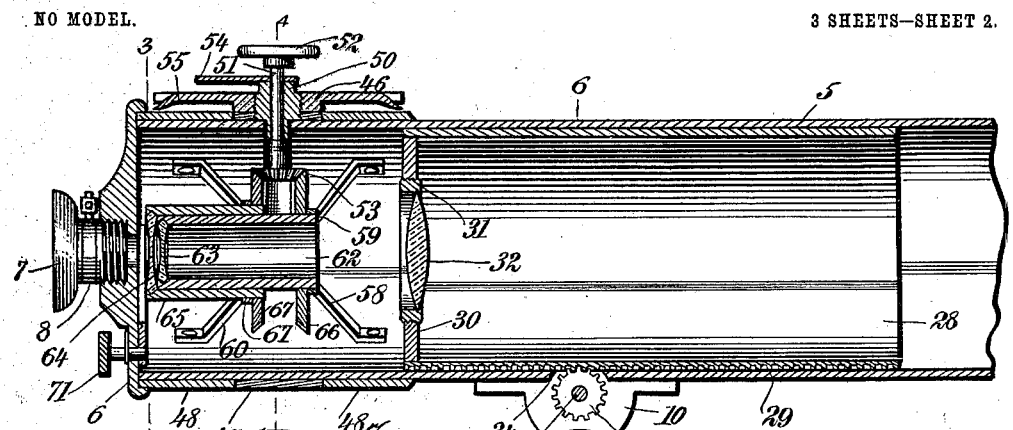
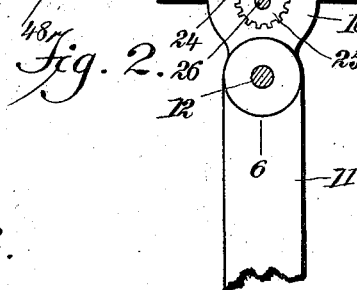
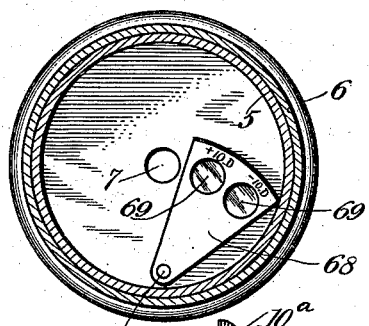
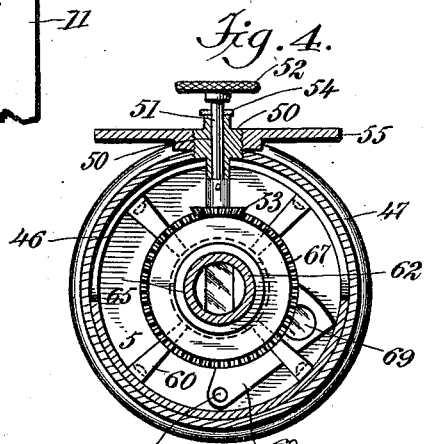
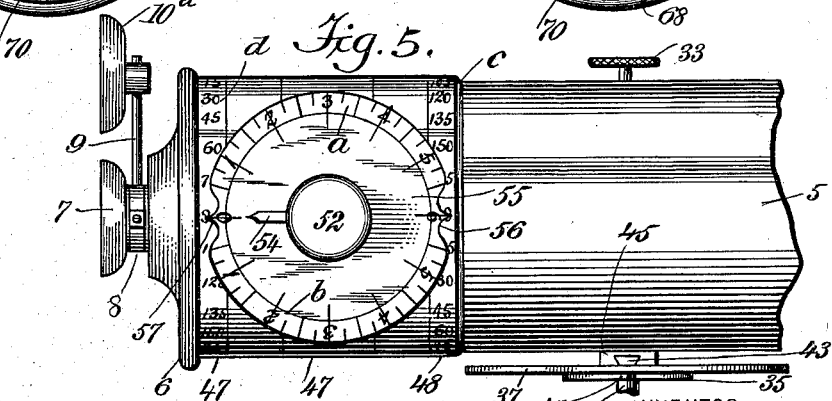

WITNESSES:
INVENTOR
William Lee Burnam
BY
ATTORNEYS.

No. 735,460. Patented August 4, 1903.

UNITED STATES PATENT OFFICE.

WILLIAM LEE BURNAM, OF KANSAS CITY, MISSOURI.

REFRACTOMETER.

SPECIFICATION forming part of Letters Patent No. 735,460, dated August 4, 1903.

Application filed September 27, 1902. Serial No. 125,024. (No model.)

*To all whom it may concern:*

Be it known that I, WILLIAM LEE BURNAM, a citizen of the United States, and a resident of Kansas City, in the county of Jackson and State of Missouri, have invented new and useful Improvements in Refractometers, of which the following is a full, clear, and exact description.

My invention relates to improvements in an instrument for use by oculists, opticians, and physicians in measuring errors of refraction as they appear in the human eye. The instrument is of the class which has become to be known as a "refractometer," or it may be termed a "mediaometer."

One object that I have in view is the provision of an improved instrument adapted to accurately measure eye troubles—such as hyperopia, myopia, and astigmatism—such instrument embodying in its construction three lenses only, through all of which the eye under examination looks at all stages of the test and without being required to look at an opaque object. Two of the three lenses are mounted adjacent to each other and are combined with means for adjusting them rotarily in one direction or the other and in a simultaneous manner, or the two lenses may be rotarily and simultaneously moved in opposite directions. The third lens or objective is adjustable toward and from the pair of lenses and maintained parallel therewith, and this group of three lenses may be so manipulated that they will have the same effect on the rays of light passing through them as either a convex or concave spherical lens or a concave or convex cylindrical lens, or any two of the lenses combined.

A further object of the invention is to provide a novel form of register mechanism associated with the means for adjusting the objective and adapted to register the refraction of the rays of light when bent to equal the focus of any lens in an ordinary trial case, whereby the employment of the instrument dispenses with the multiplicity of lenses in the ordinary trial case, the patient is not subjected to the annoyance and fatigue due to constant changes of the lenses, and more accurate and satisfactory results are obtained.

Further objects and advantages of the invention will appear from the subjoined description, and the novelty in the construction and arrangement of parts will be defined by the annexed claims.

Reference is to be had to the accompanying drawings, forming a part of this specification, in which similar characters of reference indicate corresponding parts in all the figures.

Figure 6:
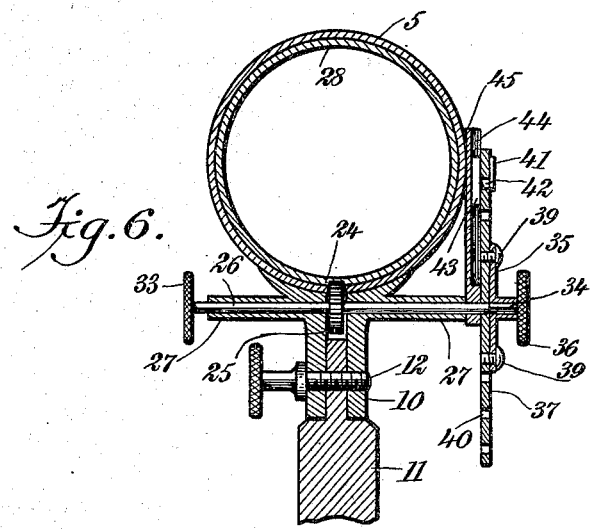
Figure 7:
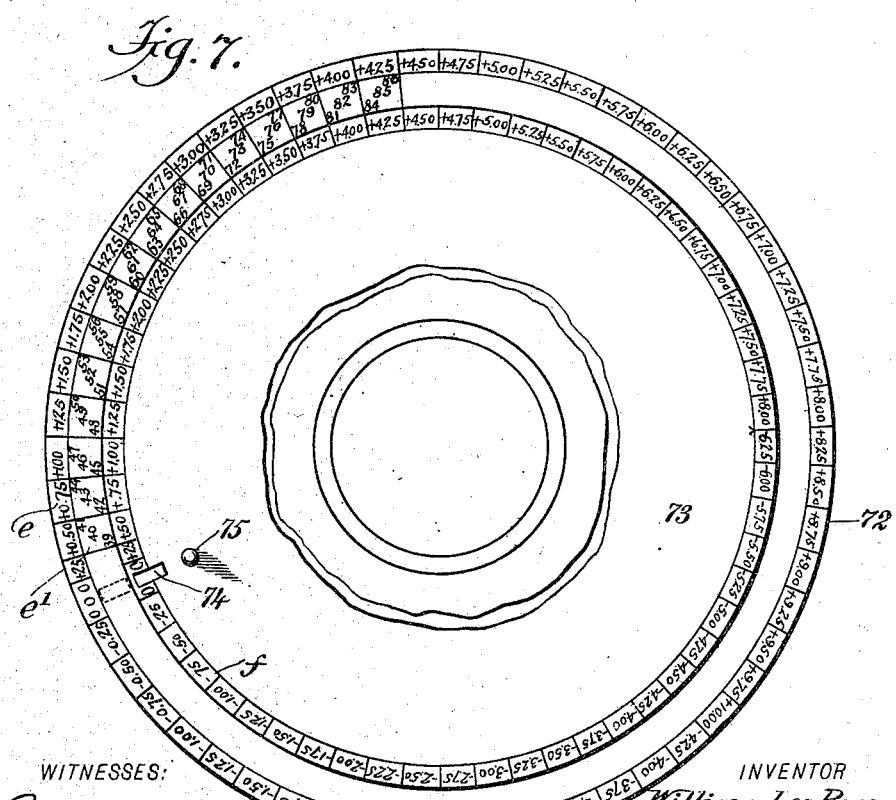

Figure 1 is a side elevation of a refractometer constructed in accordance with my invention. Fig. 2 is a longitudinal sectional elevation through a part of the instrument. Fig. 3 is a vertical transverse section on the line 3 3 of Fig. 2. Fig. 4 is another transverse section on the line 4 4 of Fig. 2. Fig. 5 is a plan view of a part of the instrument. Fig. 6 is a transverse section on the line 6 6 of Fig. 2, and Fig. 7 is an elevation of a calculator adapted to be mounted on the objective end of the instrument.

In carrying my invention into practice I employ a main tube 5, which may be constructed of any suitable material and of any appropriate length. This tube is provided at one end with a head 6, adapted to be fastened thereto by any suitable means—such, for example, as a threaded joint—and this head supports or carries an eyepiece 7, which is screwed into the head, so as to be removable therefrom, said eyepiece being disposed in axial alinement with the main tube 5. The eyepiece is provided with a collar 8, which supports or carries a radial arm 9, on which is mounted a suitable stop 10$^a$, said stop being supported at one side of the eyepiece and adapted to lie in line with the vision of the eye which is not under examination. The main tube 5 is provided at a point intermediate of its length with a depending bracket 10, the latter arranged to embrace the upper reduced extremity of a post 11, and this bracket of the tube and the post are pivotally and adjustably engaged by a clamping-screw 12. This clamping-screw may be released in order that the main tube may be adjusted to any suitable position, and the screw may again be tightened in order to firmly clamp or hold the main tube on the post. This post is provided with a series of gear-teeth forming a vertical rack 13, and said post is slidably mounted in a base 14 of any suitable construction. (See Fig. 1.) The base is also provided with a column 15, adapted to receive the vertically-adjustable post 16, which carries a suitable chin-rest 17, and this post 16 is provided with a rack 18, the latter being disposed parallel to the rack 13 on the post 11, which carries the main tube. The base is also provided with suitable journal-bearings 19, which receive a shaft 20, the same being arranged in a horizontal position on the base and provided with gear-pinions 21 22, which mesh with the racks 13 18 on the vertically-adjustable posts 11 16, respectively, whereby said shaft may be turned on manipulating the hand-wheel 23 in order to raise or lower the main tube and the chin-rest.

The main tube 5 is provided in its under side with a longitudinal slot 24, and in this slot is arranged to work a gear-pinion 25, that is rigidly attached to a horizontal adjusting arbor or spindle 26, the latter being journaled in suitable bearings 27, which are provided on or made integral with the depending bracket 10 of the main tube. Within this main tube 5 is snugly fitted an endwise-adjustable tube 28, and on the under side of this tube 28 is formed or provided a longitudinal rack 29, which lies opposite to the pinion 25 and is adapted to have intermeshing engagement therewith, whereby the tube 28 may be adjusted lengthwise within the main tube 5 when the arbor or spindle 26 is rotated. This tube 28 is provided at its inner end with a head 30, into which is screwed a ring 31, which carries the objective 32, that constitutes one of the group of three lenses employed in the implement. This lens is of the double-convex variety well known to those skilled in the art of optics, and said lens is mounted in the tube 28, so as to partake of the adjustment thereof longitudinally with respect to the main tube 5.

The operating-spindle 26 is extended at one or both ends beyond the bearings 27 and the bracket 10, and at one end of this spindle is rigidly secured a thumb-wheel 33. The end of the spindle 26 opposite to the thumb-wheel 33 is square or polygonal, as at 34, and on this square end is secured a plate 35, having a thumb-wheel 36. This plate 35 is adapted to rotate the spindle when the thumb-wheels 36 or 33 are turned by the fingers of the operator, and to this plate 35 is secured a shiftable or rotary dial-plate 37. The plate 35 is provided with curved slots 38, (shown more clearly by Fig. 1,) and through these slots pass the attaching-screws 39, which are adapted to be screwed into the dial-plate 37, thus permitting a limited angular adjustment of the dial-plate with respect to the fast plate 35 on the spindle and serving to make the dial-plate turn or rotate with said spindle. This dial-plate is provided with a spiral slot 40, having one or more convolutions, and said plate is provided with a series of graduations disposed adjacent to the edge of the spiral slot, as shown more clearly by Fig. 1. With this rotary spirally-slotted dial-plate is associated a shiftable indicator 41, arranged on the outside of the dial-plate to extend across the graduated face thereof, and this indicator is provided with a stud or pin 42, which passes through the spiral slot of the dial-plate and is secured in a vertically-movable slide 43. (See Fig. 6.) This slide is in the form of a flat plate dovetailed in cross-section, as shown by Fig. 5, and said slide is fitted in a dovetailed groove 44, which forms a guideway in a vertical guide bar or plate 45, the latter being secured firmly at its upper part to the outside of the main tube 5. As shown by Fig. 6, the lower part of the guide bar or plate 45 is extended into overlapping relation to one of the bearings 27, and through the lower end of this guide-bar passes the outer end of the adjusting-spindle 26. If desired, the lower end of the grooved guide-bar 45 may be fastened to one of the bearings 27, thus strengthening the construction of the parts.

It is well known to those skilled in optics that all persons having eyes of normal strength will focus an opera-glass or other instrument with the objective lens the same distance from the eyepiece. Myopic eyes of one degree will focus the objective a certain distance nearer to the eyepiece than the normal, while eyes troubled with hyperopia require the objective to be placed a little farther away from the eyepiece than the normal. I have ascertained the point where people with normal eyes will focus the opera-glass, and this point is indicated at zero, because the rays of light that pass through the lenses are parallel. As the objective is moved farther away from the zero-point the rays of light passing through the lenses are made to converge; but when the objective is moved farther toward the zero-point the rays of light diverge increasingly. I have noted these several points and marked them as indicating convex and concave lenses, and the spaces that represent concave lenses gradually increase on the adjustment of the objective away from the zero-point, while the spaces that represent convex lenses gradually decrease away from the zero-point. One of the problems which presented itself in the construction of a register to indicate the adjustment of the objective is to arrange the spaces and graduations on the dial-plate without crowding the indicator to such an extent as to avoid confusion. The common way of accomplishing this end is to mark the concave graduations on the telescopic or slidable tube 28 and to inscribe the convex graduations on the margin of a disk which is mounted on the arbor employed to focus the instrument. This is unsatisfactory, because the adjustment arbor or spindle frequently makes more than one complete revolution, thereby bringing the convex graduations under the pointer a second time and leading to error in reading the register. The employment of a rotary dial having a spiral slot in connection with a shiftable pointer which is limited to movement in a rectilineal path overcomes this objection and provides an accurate and exceedingly-simple construction to indicate the adjustment of the objective 32. The rotary slotted dial is mounted on the adjusting-spindle at one side of the main tube, and as the spiral may have any desired number of convolutions it is evident that the dial-plate can be inscribed with any desired number of graduations to indicate the convex and concave lenses required, thus enabling me to register this data in one place on the instrument.

The main tube 5 is provided in rear of the objective with a semicircular slot 46, (indicated by full lines in Figs. 2 and 4 and by dotted lines in Fig. 1,) and over this slotted portion of the main tube is fitted a shiftable band or sleeve 47, the same being disposed between the bands 48, which are rigidly secured to the main tube 5 on opposite sides of the slot 46. This shiftable sleeve 47 is confined against edgewise displacement on the main tube by the fixed bands 48, and said sleeve serves to embrace or house the semicircular slot 46. This shiftable sleeve 47 is provided with an enlargement 50, which constitutes a bearing for an adjustable shaft 51, the same passing into the main tube 5, so as to occupy a radial position therein. This adjusting-shaft is provided at its outer end with a thumb-wheel 52 and on the inner side of said shaft is firmly secured a bevel gear-pinion 53, said shaft and its parts being adjustable to different angular positions within the slotted main tube when the sleeve 47 is turned on said tube. This shaft 51 is furthermore provided with an index 54, which is adapted to traverse the graduations $a\ b$ on a dial-plate 55, which is made fast with or secured to the shiftable sleeve 47, said dial-plate being disposed in concentric relation to the adjusting-shaft 51 and being shiftable with said shaft and the pointer 54 when the sleeve 47 is turned around the main tube. The dial-plate 55 is provided at diametrically opposite sides with the pointers 56 57, which are adapted to traverse the scales $c\ d$, which are provided on the stationary bands 48, and these scales are graduated to indicate the axes of all cylindrical lenses.

58 designates a spider which is provided with a ring-like bearing 59, and this spider is secured in the main tube 5 at a suitable point in rear of the objective 32, and on one side of the semicircular slot 46 a similar spider 60 is provided with a ring-like bearing 61, and it is mounted in the main tube 5, so as to lie on the opposite side of the slot 46, between the latter and the head 6, which carries the eyepiece 7.

62 designates a tube which is mounted in the bearing 59 of the spider 58 to have its axis coincident with that of the main tube 5 and the telescopic tube 28, said tube 62 being adapted to rotate or turn freely in said bearing of the spider. This tube is provided at or near its rear end with a lens 63, and another lens, 64, is disposed adjacent to said lens 63, the two lenses 63 64 being mounted or disposed in parallel planes, so as to lie in line with the axis of the tubes 5 28 and the eyepiece 7. The lens 64, however, is mounted for rotary adjustment independently of the lens 63, and said lens 64 is secured or held in a tube or sleeve 65, which is disposed concentric with the tube 62 and partially surrounds the latter. The tube or sleeve 65 is fitted in the bearing 61 of the spider 60 to rotate or turn freely therein, and it will thus be seen that the tubes 62 65 are mounted individually in the spiders, so as to turn therein independently of each other, thus making provision for the rotary adjustment of the lenses 63 64.

I have provided mechanism for simultaneously imparting rotary adjustment in opposite directions to the tubes 62 65 and the lenses 63 64, which are mounted therein, and this mechanism contemplates the employment of bevel gear-wheels 66 67, which are secured, respectively, on the tubes 62 65 so as to lie on opposite sides of the bevel-pinion and having intermeshing engagement therewith.

The sleeve 47 and its contained parts may be adjusted around the tube 5 so as to make the shaft 51 occupy different angular positions with respect to the tube, and this shiftable movement of the sleeve is communicated by the shaft and the gearing to the tubes 62 65 in a manner to impart rotary adjustment conjointly to the lenses 63 64 in one direction or the other and without disturbing the parallel relation of the lenses to each other and also without shifting or changing the axes of said lenses with respect to each other. The shaft 51, however, may be turned on its axis by manipulating the thumb-wheel 52, and this rotation of the shaft drives the bevel-gear 53 so as to turn the bevel gear-wheels 66 67 in opposite directions simultaneously, thereby imparting like movement to the concentric tubes 62 65 and turning one lens 63 in one direction while the other lens 64 is turned in the other direction.

It is a well-known fact in optics that two cylindrical lenses arranged one against or over the other are equal to a spherical lens of the same number or focus of one of the cylinders provided the neutral lines or axes of the adjacent lenses are at right angles. For example, a lens having a $-3.00$ D-cylinder over a $-3.00$ D-cylindrical lens whose axes are at right angles is equal to a $-3.00$ spherical lens. If the axes of the two lenses are placed parallel, the lens will be equal to a cylindrical lens $-6.00$ D. This being true, if the two cylindrical lenses are mounted at right angles and they are gradually rotated in opposite directions so as to bring their axes into parallelism the operator is enabled to gradually produce a cylindrical lens and destroy the spherical effect. My improved mechanism for mounting and adjusting the companion lenses 63 64 enables me to bring them into very close relation and to simultaneously rotate the two cylinders into opposite direction and at equal speed.

From the foregoing description, taken in connection with the drawings, it will be seen that my improved instrument employs only three lenses, two of the lenses being compound and combined or acting together as a single eyepiece, while the other of the three spherical lenses serves as the objective. The spherical lens is adapted to be converted into a cylindrical lens by rotating the compound lenses in opposite directions and by moving the objective toward or from the eyepiece until the vision becomes clear. The companion cylindrical lenses 63 64 are mounted in their respective tubes so that their axes are at right angles and the pointer 54 is adapted to indicate the zero graduations on the dial-plate 55. By turning the pointer 54 to the right the axes of the cylindrical lenses 63 64 will be brought into parallelism or horizontal and stand at one hundred and eighty degrees; but if the pointer is turned to the left the axes of the cylindrical lenses 63 64 will be brought at right angles to each other. The cylindrical effect of the companion lenses which is produced from plus to minus is marked on one half of the dial, as at $a$, while the cylindrical effect produced from minus to plus is marked on the other half of the dial, as at $b$. The axes of the lenses can be changed at will by simply moving the dial 55 and the shaft 51 around the main tube, and the pinion 53 will move the tubes 62 65 and the lens in the same direction without changing the relative positions of said lenses.

On the inside of the head 6 is arranged an adjustable plate 68, which is provided with supplementary lenses 69, adapted to be brought into register individually with the eyepiece 7, and this plate is carried by a spindle 70, which passes through the head 6 and is equipped with a thumb-wheel 71. The supplementary lenses 69 should be brought in front of the eyepiece only when it is desirable to increase the capacity of the instrument in measuring high degrees of myopia or hyperopia.

On the portion of the instrument opposite to the eyepiece I mount a calculator consisting of a dial-plate 72 and a companion dial-plate 73, the latter being of smaller diameter than the plate 72 and adapted to be rotated or turned with relation thereto and to the tube 5. This dial-plate 72 is provided with graduations and indications $e$ $e'$ to denote the age of the patient and the proper lenses that should be prescribed. The other dial-plate 73 is adapted to partially cover the age-graduations $e'$, and it is provided with an observation-slot 74 and with a suitable handle 75. Said dial-plate 73 is also provided with graduations, as $f$, to indicate other data useful in preparing a prescription, and this dial-plate 73 may be adjusted by means of a handle 75 to bring the slot 74 over the data $e'$. The inscriptions are provided on the dial-plates 72 73 so as to face toward the eyepiece and the information thereon is intended to give a close approximation of the amount of presbyopia which may exist at any age from forty to eighty years.

Having thus described my invention, I claim as new and desire to secure by Letters Patent—

1. A refractometer having a main tube, another tube slidably fitted therein and carrying an objective, an adjusting-spindle geared to the slidable tube, a spirally-slotted dial having a plurality of graduations along the edge of the slot therein and fixed centrally to the spindle to be rotated thereby, a bar having a guideway and fixed on the main tube, and a pointer slidable in the guideway and fitted in the slot of said turning-dial.

2. A refractometer having telescopic tubes, one of which carries an objective, a revoluble spindle geared to the objective-carrying tube for imparting movement thereto relative to the other tube, a spirally-slotted dial clamped centrally to the spindle for rotation thereby and provided with a plurality of graduations adjacent to said spiral slot, a guideway on a relatively stationary member of said telescopic tube, and a traveling indicator confined in the guideway and shiftable by the rotary movement of the dial.

3. A refractometer having telescopic tubes, an objective movable with one of said tubes, a revoluble spindle geared to one tube, a plate fixed to said spindle, a revoluble dial clamped on and adjustable angularly with relation to said plate and provided with a spiral groove and with graduations, and a shiftable indicator controllable by the rotation of said dial.

4. A refractometer having a slotted main tube, a radial shaft passing through the slot of the main tube, concentric tubes independently mounted within the main tube and in coaxial relation to each other and to the main tube, and means connecting the radial shaft and the concentric tubes and adapted to make said tubes turn simultaneously with the shaft on an angular adjustment of the same in the slot of the main tube and to turn the concentric tubes simultaneously and in opposite directions by turning the radial shaft on its axis, and lenses mounted separately in the inner ends of the concentric tubes.

5. A refractometer having a circumferentially-slotted main tube provided with an eyepiece, a shiftable carrier fitted on said main tube to inclose the slot therein, a radial shaft mounted in said carrier and extending into the main tube, concentric tubes mounted coaxially within the main tube and geared at their inner end to the radial shaft, and lenses mounted in the outer ends of the concentric tubes and disposed in close relation to the eyepiece.

6. A refractometer having a circumferentially-slotted main tube provided with an eyepiece, concentric tubes mounted coaxially with relation to the main tube and the eyepiece, lenses mounted separately in the outer ends of the tubes and disposed close to the eyepiece, a carrier shiftably fitted on the main tube, a radial shaft mounted in the carrier and provided at its inner end with a gear, and other gears fixed to the concentric tubes and meshing with the gear of said shaft.

7. A refractometer having a slotted main tube, separate spiders secured within said tube, concentric tubes individually mounted in the spiders and carrying juxtaposed lenses, gears secured to the inner ends of the concentric tubes, a carrier shiftably fitted to the main tube, and a radial shaft journaled in the carrier and having a gear which meshes with said gears of the tubes.

8. A refractometer having a slotted main tube, a carrier-ring embracing the slotted portion of said tube, concentric tubes mounted coaxially within the main tube and carrying lenses, a shaft journaled in the carrier-ring and geared to the concentric tubes, a dial fixed externally to the carrier-ring, and a pointer carried by the radial shaft to traverse said dial.

9. A refractometer having a slotted main tube, bands fixed to the main tube on opposite sides of the slot therein and provided with graduations, a shiftable carrier-ring fitted to the main tube between the bands thereon, a dial attached to said carrier-ring and provided with pointers to traverse the graduated bands, concentric tubes within the main tubes and provided with lenses, a radial shaft journaled in the carrier-ring and geared to the concentric tubes, and a pointer on said shaft to traverse the dial.

10. A refractometer comprising a base, a post extending upwardly therefrom, a horizontal tube mounted on said post and equipped with a series of lenses and with a lens-adjusting mechanism, a stem also supported on the base, a chin-rest carried by the stem adjacent to one end of said tube, and means for simultaneously adjusting the tube and the chin-rest.

11. A refractrometer comprising a base having hollow posts, a slidable post fitted in one of said hollow posts, a main tube provided with an eyepiece and with adjustable lenses, said main tube being attached to and adjustable with said slidable post, a stem slidably fitted in another post of the base and provided with a chin-rest, and means for simultaneously adjusting the slidable post and the stem.

In testimony whereof I have signed my name to this specification in the presence of two subscribing witnesses.

WILLIAM LEE BURNAM.

Witnesses:
R. M. GAYNOR,
LYDIA HUNT.